US012644659B2

(12) United States Patent
Bai et al.

(10) Patent No.: US 12,644,659 B2
(45) Date of Patent: Jun. 2, 2026

(54) HEAT EXCHANGER INLET AND OUTLET PIPE CONNECTION STRUCTURE

(71) Applicant: Hanon Systems, Daejeon (KR)

(72) Inventors: Ling Bai, Northville, MI (US); Guglielmo Abate, Canton, MI (US); James L. Smitterberg, Grass Lake, MI (US); Davon James Laird, Commerce Township, MI (US)

(73) Assignee: HANON SYSTEMS, Daejeon (KR)

( * ) Notice: Subject to any disclaimer, the term of this patent is extended or adjusted under 35 U.S.C. 154(b) by 153 days.

(21) Appl. No.: 18/782,230

(22) Filed: Jul. 24, 2024

(65) Prior Publication Data

US 2025/0067527 A1     Feb. 27, 2025

Related U.S. Application Data

(60) Provisional application No. 63/578,291, filed on Aug. 23, 2023.

(51) Int. Cl.
*F28F 9/02*          (2006.01)
*F16L 41/08*        (2006.01)

(52) U.S. Cl.
CPC ............ *F28F 9/0256* (2013.01); *F16L 41/08* (2013.01); *F28F 2230/00* (2013.01)

(58) Field of Classification Search
CPC .... F28F 9/0256; F28F 9/0243; F28F 2230/00; F16L 41/08
USPC ........................................................ 165/165
See application file for complete search history.

(56)                References Cited

U.S. PATENT DOCUMENTS

| | | | | |
|---|---|---|---|---|
| 6,557,373 B1 * | 5/2003 | Nitta | .................... | B23K 1/0012 |
| | | | | 62/509 |
| 7,637,538 B2 * | 12/2009 | Tchang | .................. | F16L 37/56 |
| | | | | 285/205 |
| 7,770,412 B2 * | 8/2010 | Ishizaka | .................. | F25B 41/00 |
| | | | | 62/170 |
| 7,926,853 B2 * | 4/2011 | Katoh | .................. | F28F 9/0256 |
| | | | | 285/124.1 |

(Continued)

FOREIGN PATENT DOCUMENTS

| | | |
|---|---|---|
| EP | 1612501 A1 | 1/2006 |
| EP | 1975540 A1 | 10/2008 |

(Continued)

*Primary Examiner* — Claire E Rojohn, III
(74) *Attorney, Agent, or Firm* — Shumaker, Loop & Kendrick, LLP; James D. Miller

(57)                ABSTRACT

A heat exchanger includes a pipe connection structure including a first coupling element and a second coupling element. The first coupling element includes a through-hole formed therethrough and the second coupling element includes a blind hole formed therein. A manifold tank includes a first tank compartment in alignment with the through-hole of the first coupling element and a second tank compartment in alignment with the blind hole of the second coupling element. The through-hole provides fluid communication between an interior of the pipe connection structure and the first tank compartment while the second coupling element forms a fluid barrier wall at an end of the blind hole thereof that prevents fluid communication between the interior of the pipe connection structure and the second tank compartment by way of the second coupling element.

20 Claims, 7 Drawing Sheets

(56) References Cited

U.S. PATENT DOCUMENTS

| 8,276,401 | B2 * | 10/2012 | Higashiyama | F28D 1/05391 |
| | | | | 62/526 |
| 8,882,155 | B2 * | 11/2014 | Dittly | F28F 9/0251 |
| | | | | 285/133.11 |
| 9,568,225 | B2 * | 2/2017 | Chowdhury | F25B 39/02 |
| 9,777,878 | B2 * | 10/2017 | Kesler | B60H 1/00571 |
| 10,871,335 | B2 * | 12/2020 | Dolderer | F28F 9/0253 |
| 12,392,565 | B2 * | 8/2025 | Jeon | F28F 17/005 |
| 2007/0169508 | A1 * | 7/2007 | Ichiyanagi | F25D 23/003 |
| | | | | 62/498 |
| 2008/0023183 | A1 * | 1/2008 | Beamer | F28F 9/0273 |
| | | | | 165/174 |
| 2008/0029259 | A1 * | 2/2008 | Rechea | F28F 9/0256 |
| | | | | 165/178 |
| 2009/0056921 | A1 * | 3/2009 | Arino | F28F 9/0253 |
| | | | | 165/153 |
| 2012/0097365 | A1 * | 4/2012 | Papoulis | F28D 9/0056 |
| | | | | 165/61 |
| 2013/0087317 | A1 * | 4/2013 | Papoulis | F28F 3/046 |
| | | | | 165/177 |
| 2013/0312454 | A1 * | 11/2013 | Jeon | F28F 9/0207 |
| | | | | 62/524 |
| 2013/0312455 | A1 * | 11/2013 | Jeon | F28F 9/26 |
| | | | | 62/526 |
| 2017/0158027 | A1 * | 6/2017 | Lee | F28F 9/0204 |
| 2021/0270547 | A1 * | 9/2021 | Lee | F28F 1/126 |
| 2024/0352886 | A1 * | 10/2024 | Bai | F02B 29/0493 |
| 2024/0353187 | A1 * | 10/2024 | Christiono | F28D 7/103 |
| 2025/0067527 | A1 * | 2/2025 | Bai | F28F 9/028 |

FOREIGN PATENT DOCUMENTS

| KR | 1020220113273 A | 8/2022 |
| KR | 1020230095820 A | 6/2023 |

* cited by examiner

HEAT EXCHANGER INLET AND OUTLET PIPE CONNECTION STRUCTURE

CROSS-REFERENCE TO RELATED APPLICATION

This patent application claims priority to U.S. Provisional Patent Application Ser. No. 63/578,291, filed on Aug. 23, 2023, the entire disclosure of which is hereby incorporated herein by reference.

FIELD OF THE INVENTION

The disclosure relates to a heat exchanger, and more particularly, to an inlet pipe connection structure and an outlet pipe connection structure for a condenser of a heating, ventilating, and air conditioning (HVAC) system of a vehicle, wherein the condenser and pipe connection structures occupy a minimized packaging space within the vehicle.

BACKGROUND OF THE INVENTION

Heating, ventilation, and air conditioning systems play an integral role in ensuring the comfort and well-being of passengers within vehicles. Among the components crucial to the proper functioning of such systems, condensers serve as pivotal elements for heat exchange, facilitating the cooling of refrigerant gases and enabling effective temperature regulation within the vehicle cabin.

It has become increasingly common for at least one of the condensers utilized in the HVAC system of an electric or hybrid (electric) vehicle to be what may be referred to as an internal condenser, which corresponds to a condenser that is provided within an HVAC casing for exchanging heat with air to be delivered to the passenger compartment of the vehicle. The internal condenser may accordingly be utilized when the electric vehicle does not have access to the heat traditionally generated by operation of an internal combustion engine, but instead relies upon the use of heat resulting from the compression of a circulating refrigerant of the HVAC system.

The design of an internal condenser for a vehicle HVAC system demands careful consideration of several factors, including space limitations, performance criteria, and structural integrity. Achieving an optimal balance among these factors poses significant challenges, particularly in scenarios where space is at a premium and performance targets are demanding. The efficient utilization of available packaging space to accommodate the internal condenser unit while delivering the required cooling efficiency is accordingly an ongoing concern in vehicle design.

Additionally, the connection of inlet and outlet pipes to the manifold tanks of the internal condenser unit presents a challenge due to the limited space available for such connections. These connections are essential for the proper circulation of refrigerant and, in some circumstances, for providing structural stability to the internal condenser unit at the junction of each of the inlet and outlet pipes with one of the manifold tanks formed on opposing ends of the internal condenser unit. The challenge is amplified in cases where extreme packaging constraints necessitate complex geometries to accommodate the necessary connections, such as including the corresponding refrigerant entering or exiting the condenser at contrary configurations or orientations.

Accordingly, it would be desirable to produce an improved configuration of the inlet and outlet pipe connection structures of a condenser unit for optimizing performance, improving structural stability, and minimizing a packaging space of the condenser unit.

SUMMARY OF THE INVENTION

In concordance and agreement with the presently described subject matter, an improved inlet and outlet pipe configuration has surprisingly been discovered.

In one embodiment, a heat exchanger comprises a first pipe connection structure including a first outer wall defining at least a portion of an interior of the first pipe connection structure with the interior of the first pipe connection structure receiving a first fluid therein. A first coupling element is received in a first opening formed through the first outer wall of the first pipe connection structure with the first coupling element including a first through-hole formed therethrough. A second coupling element is received in a second opening formed through the first outer wall of the first pipe connection structure. A first manifold tank is coupled to each of the first coupling element and the second coupling element with the first manifold tank including a first tank compartment extending longitudinally from the first coupling element and a second tank compartment extending longitudinally from the second coupling element. The first through-hole of the first coupling element provides fluid communication of the first fluid between the interior of the first pipe connection structure and the first tank compartment and the second coupling element forms a first fluid barrier wall for preventing fluid communication of the first fluid between the interior of the first pipe connection structure and the second tank compartment by way of the second coupling element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figures 9, 10:
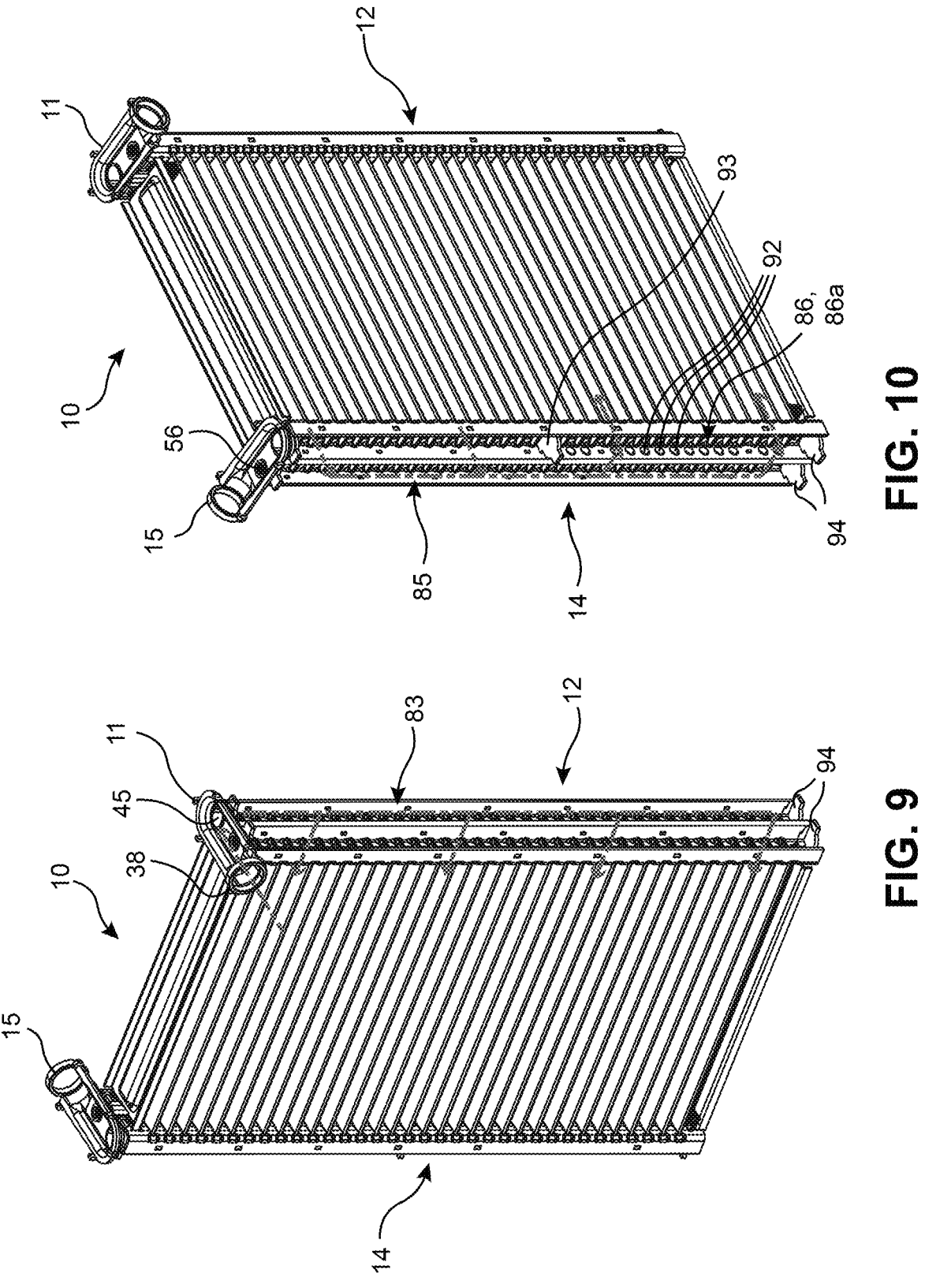
Figures 11, 12:
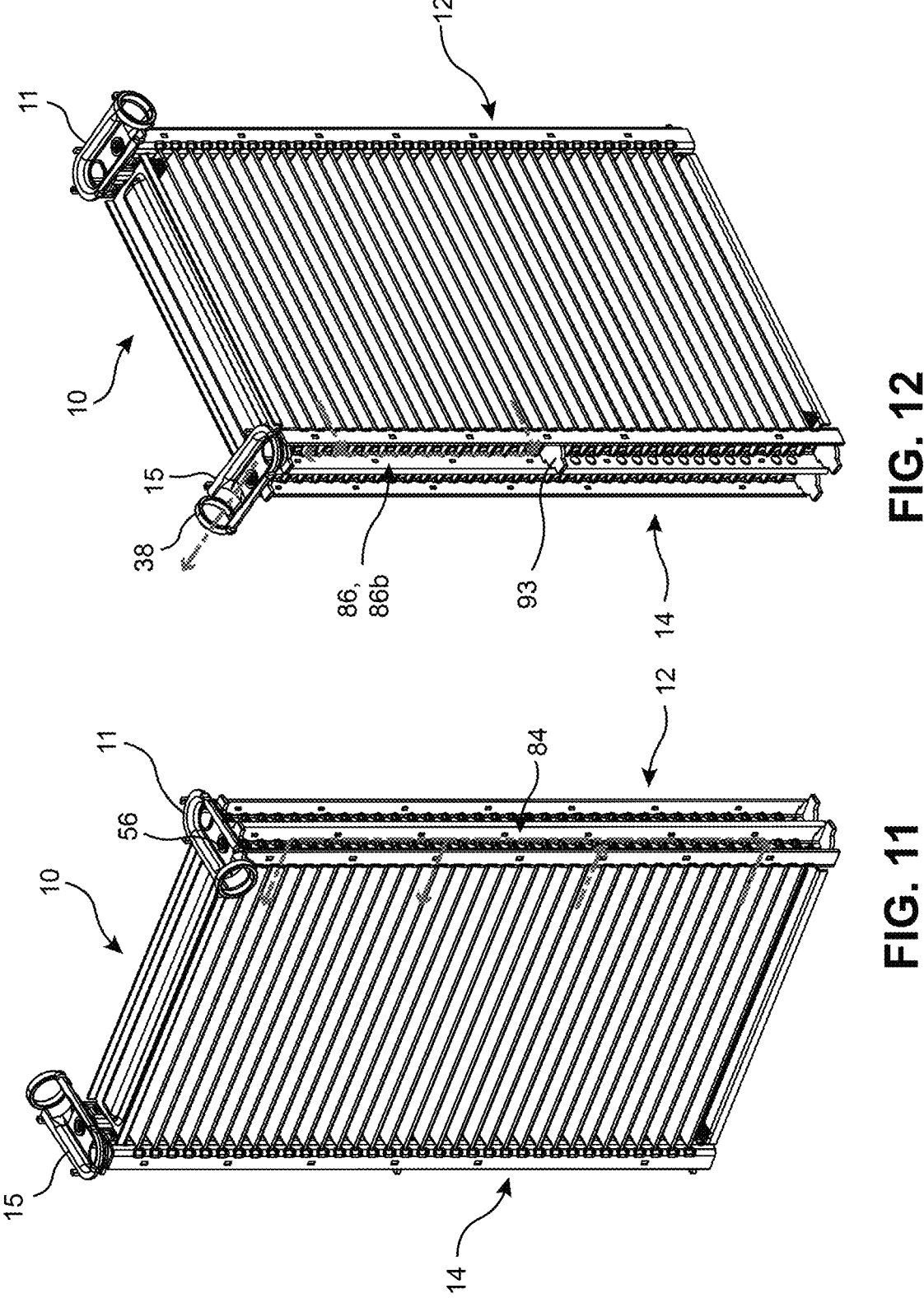
Figure 13:
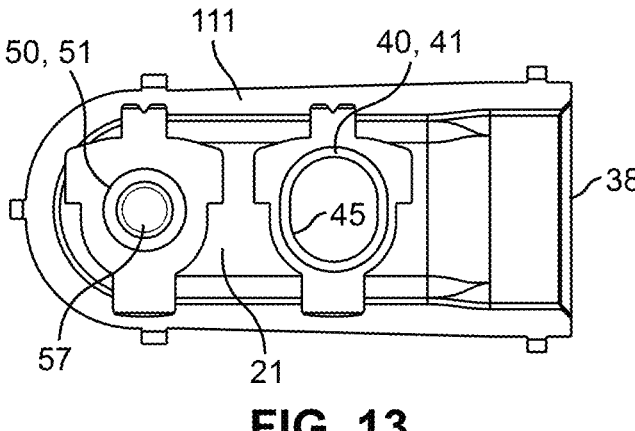

FIG. 9 is a front-right perspective view of the internal condenser showing an interior of each the first pipe connection structure, a first tank compartment of the first manifold tank, and a second tank compartment of the first manifold tank with the refrigerant flowing from an interior of the first pipe connection structure to the first tank compartment, and then through a first set of heat exchanger tubes connecting the first manifold tank to the second manifold tank;

FIG. 10 is a front-left perspective view of the internal condenser of FIG. 9 showing an interior of each a second pipe connection structure, a third tank compartment of the second manifold tank, and a fourth tank compartment of the second manifold tank with the refrigerant flowing from the first set of the heat exchanger tubes to the third tank compartment, laterally from the third tank compartment into a first portion of the fourth tank compartment, and then through a second set of heat exchanger tubes connecting the first manifold tank to the second manifold tank;

FIG. 11 is a front-right perspective view of the internal condenser of FIGS. 9 and 10 with the refrigerant flowing from the second set of heat exchanger tubes and into the second tank compartment before flowing axially therethrough for passage through the second set of the heat exchanger tubes back towards the fourth tank compartment of the second manifold tank;

FIG. 12 is a front-left perspective view of the internal condenser of FIGS. 9-11 with the refrigerant flowing from the second set of heat exchanger tubes and into a second portion of the fourth tank compartment before flowing into the interior of the second pipe connection structure; and FIG. 13 is a bottom plan view of a pipe connection structure according to an alternative embodiment of the present invention.

DETAILED DESCRIPTION OF AN EMBODIMENT OF THE DISCLOSURE

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
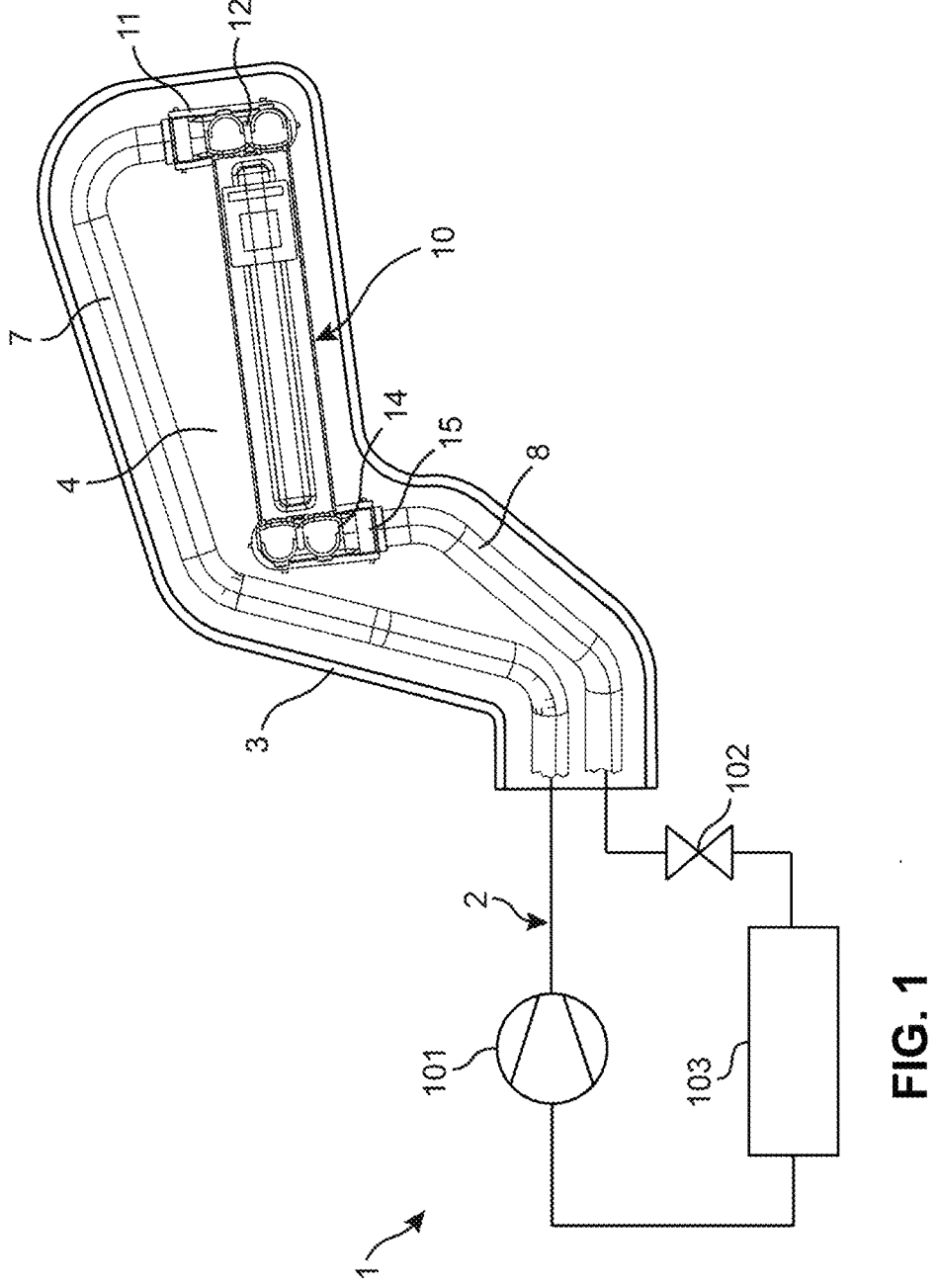
FIG. 1 is a partially schematic bottom plan view of an HVAC system having an internal condenser according to an embodiment of the present invention.

FIG. 1 illustrates an HVAC system I having an internal condenser 10 according to an embodiment of the present invention. The HVAC system 1 includes a refrigerant circuit 2 having at least a portion thereof disposed within a casing 3 of the HVAC system 1. Specifically, the internal condenser 10 of the present invention may be disposed within a condenser compartment 4 of the casing 3, and the condenser compartment 4 may be in fluid communication with air passing through the casing 3. The condenser compartment 4 may be configured to receive the air in a manner wherein the air flows around an exterior surface of the internal condenser 10 when the refrigerant passes through the condenser compartment 4 for facilitating the transfer of heat from the refrigerant passing through the interior of the internal condenser 10 to the air flowing over the exterior thereof.

The refrigerant circuit 2 may include, in an order of flow of a refrigerant therethrough, a compressor 101, the internal condenser 10, an expansion element 102, and an evaporator 103. The refrigerant circuit 2 may include additional components while remaining within the scope of the present invention, such as utilizing a branching of the refrigerant circuit 2 at select locations to facilitate the ability to flow the refrigerant through two or more flow paths in a parallel flow configuration or to switch the refrigerant flowing between the two different flow paths. For example, the internal condenser 10 may be provided in parallel relative to an external condenser (acting as a radiator, not shown) of the refrigerant circuit 2 that is placed in fluid communication with the ambient air, or may otherwise be switchable between the internal condenser 10 and the external condenser. In other embodiments, the refrigerant circuit 2 may include the external condenser (radiator) and the internal condenser 10 arranged in series to cause the refrigerant to be cooled successively in each condenser, as desired.

As shown throughout FIGS. 1-12, the internal condenser 10 includes a first (inlet) pipe connection structure 11, a first (inlet) manifold tank 12, a plurality of heat exchanger tubes 13, a second (outlet) manifold tank 14, and a second (outlet) pipe connection structure 15. The first pipe connection structure 11 is configured to be coupled to a first (inlet) fluid line 7 of the refrigerant circuit 2 and the second pipe connection structure 15 is configured to be coupled to a second (outlet) fluid line 8 thereof. The first fluid line 7 may be configured to convey a flow of the refrigerant after exiting the compressor 101 to the internal condenser 10 while the second fluid line 8 may be configured to convey the refrigerant exiting the internal condenser 10 to a downstream-arranged component of the corresponding refrigerant circuit 2, such as the previously mentioned expansion element 102 of the refrigerant circuit 2, among other possible components (depending on the configuration of the corresponding refrigerant circuit 2). Each of the fluid lines 7, 8 may be representative of any suitable hose, pipe, or conduit of the refrigerant circuit 2 capable of conveying the refrigerant therethrough in a desired manner, including not subjecting the refrigerant to an undesirably high drop in pressure or a sudden change in flow area when passing through either of the fluid lines 7, 8. In some embodiments, each of the fluid lines 7, 8 may extend through a portion of the condenser compartment 4 conveying the air therethrough in a manner wherein the fluid lines 7, 8 may play a role in exchanging heat between the air flowing through the condenser compartment 4 and the refrigerant conveyed through the interior of the condenser 10. The first (inlet) fluid line 7 may include a greater length thereof extending through the condenser compartment 4 in comparison to the second (outlet) fluid line 8 to result in a greater degree of heat exchange occurring between the air and the refrigerant within the first fluid line 7 than is occurring between the air and the refrigerant within the second fluid line 8.

Figure 2:
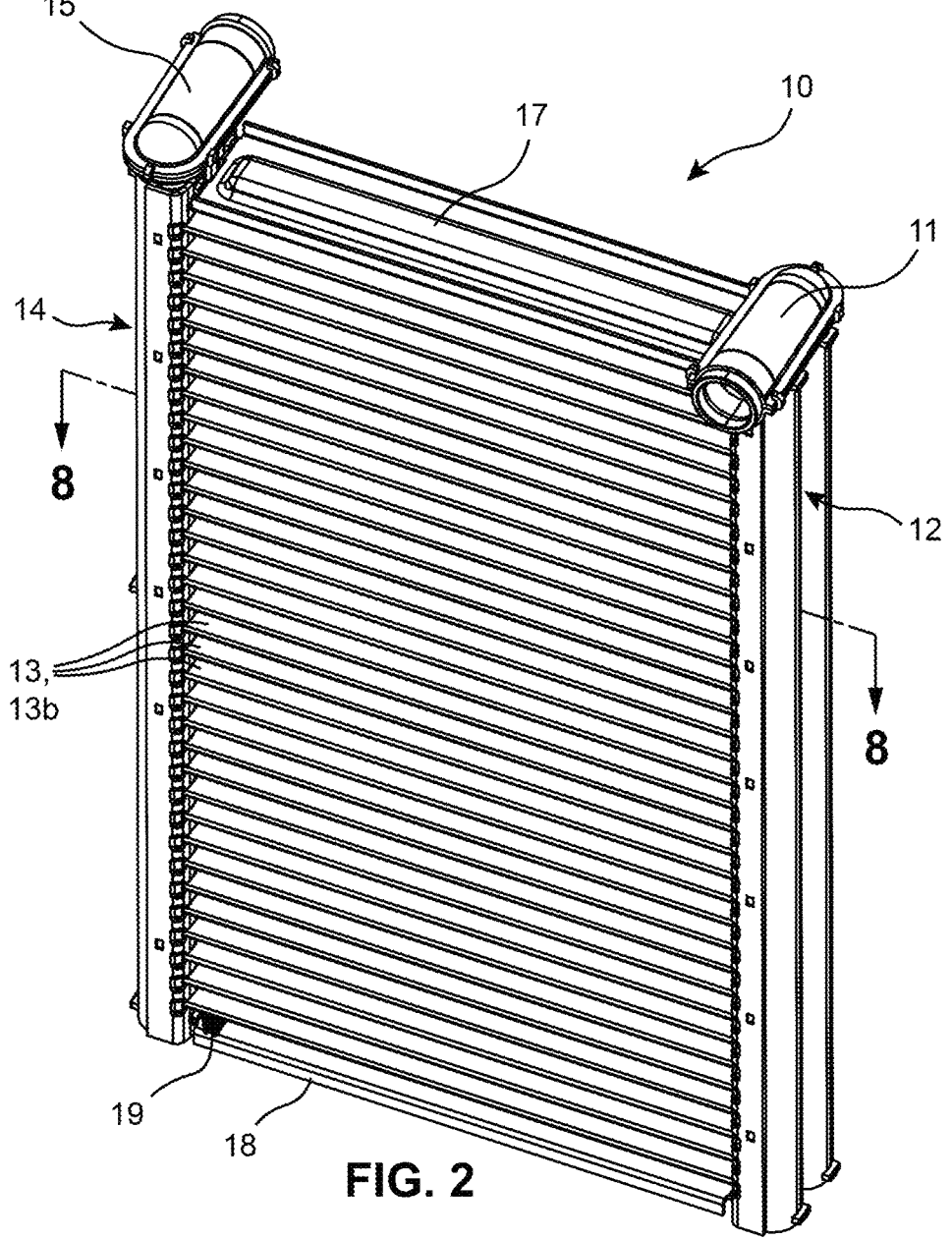
FIG. 2 is a front perspective view of the internal condenser of the HVAC system of FIG. 1.

The internal condenser 10 further includes a first connecting plate 17 and a second connecting plate 18 disposed at opposing ends of the plurality of the heat exchanger tubes 13. The first connecting plate 17 connects a first end of the first manifold tank 12 to a first end of the second manifold tank 14 while the second connecting plate 18 connects a second end of the first manifold tank 12 to a second end of the second manifold tank 14. A plurality of fins 19 or similar surface area increasing features may be provided between each successive row of the heat exchanger tubes 13 and/or each of the connecting plates 17, 18 to provide additional surface area in heat exchange relationship with the refrigerant and the air disposed within the condenser compartment 4. FIG. 2 shows only a representative example of a relatively small segment of the fins 19 disposed between the second connecting plate 18 and one of the heat exchanger tubes 13 so as not to occlude the features of the heat exchanger tubes 13 and/or connecting plates 17, 18, but it should be understood that the fins 19 may be disposed between each of the successive rows of the heat exchanger tubes 13 and/or connecting plates 17, 18 and may extend along a length of each of the heat exchanger tubes 13 and/or connecting plates 17, 18 (extending between the first and second manifold tanks 12, 14) for maximizing the heat exchange capacity of the internal condenser 10 while remaining within the scope of the present invention.

Figure 3:
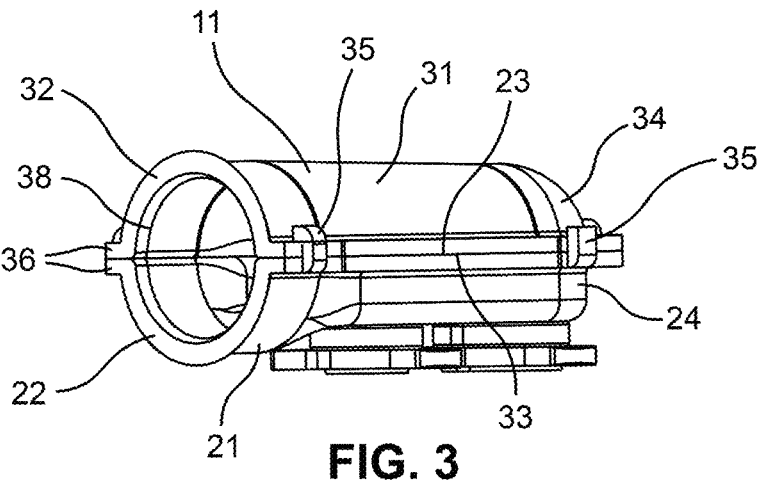
FIG. 3 is a perspective view of a first pipe connection structure of the internal condenser.
Figure 4:
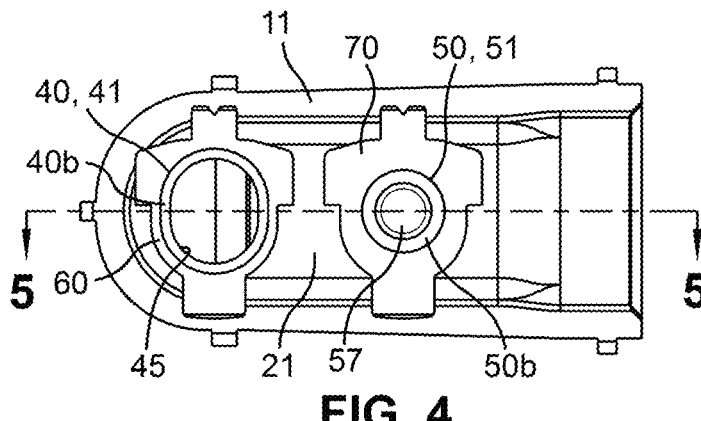
FIG. 4 is a bottom plan view of the first pipe connection structure of FIG. 3.

As best shown in FIG. 3, the first pipe connection structure 11 includes a first shell 21 coupled to a second shell 31, wherein each of the shells 21, 31 forms an outer wall of the first pipe connection structure 11. Each of the first shell 21 and the second shell 31 includes two perpendicular arranged side surfaces thereof that are open for providing fluid access into the interior of each of the respective shells 21, 31. Specifically, the first shell 21 includes an open pipe connection surface 22 having a semi-circular perimeter shape and an elongate and open coupling surface 23 extending away from the diametrically opposing ends of the semi-circular pipe connection surface 22 on a plane arranged perpendicular thereto. The open coupling surface 23 extends longitudinally and defines a closed end 24 thereof opposite the pipe connection surface 22. The second shell 31 similarly includes an open pipe connection surface 32 having a semi-circular perimeter shape and an elongate and open coupling surface 33 extending away from the diametrically opposing ends of the semi-circular pipe connection surface 32 on a plane arranged perpendicular thereto. The coupling surface 33 extends longitudinally and defines a closed end 34 thereof opposite the pipe connection surface 32 thereof.

The first shell 21 is configured for coupling to the second shell 31 with the coupling surfaces 23, 33 facing and engaging each other about the perimeters thereof, the pipe connection surfaces 22, 32 aligned to cooperate and form a cylindrical opening 38 into an interior of the first pipe connection structure 11 for receiving and coupling to an end portion of the first fluid line 7, and the closed ends 24, 34 of the coupling surfaces 23, 33 aligned and engaging each other to delimit a flow of the refrigerant within the interior of the first pipe connection structure 11 with respect to the direction of flow of the refrigerant when entering the first pipe connection structure 11 via the first fluid line 7 and the cylindrical opening 38. One or both of the opposing coupling surfaces 23, 33 may include one or more crimping tabs 35 extending outwardly therefrom for crimping the shells 21, 31 to one another about the perimeters of the engaging coupling surfaces 23, 33. Each of the respective coupling surfaces 23, 33 may further include an outwardly flanged portion 36 extending around the perimeter thereof configured to receive one of the crimping tabs 35 from the other of the coupling surfaces 23, 33 therearound when coupling the shells 21, 31 to each other.

The first shell 21 further includes a first coupling element 40 and a second coupling element 50 extending outwardly therefrom (towards an exterior of the first pipe connection structure 11) along a portion of the first shell 21 disposed directly opposite the open coupling surface 23 thereof, wherein each of the coupling elements 40, 50 may extend outwardly and axially in a direction transverse (including perpendicular) to the direction of flow of the refrigerant entering the interior of the first pipe connection structure 11 via the cylindrical opening 38. In the illustrated embodiment, the first coupling element 40 is an independently provided first fitting 41 that is received through a corresponding first opening 27 formed through the wall of the first shell 21, and the second coupling element 50 is similarly an independently provided second fitting 51 that is received through a corresponding second opening 28 formed through the wall of the first shell 21. However, the coupling elements 40, 50 may alternatively be provided as machined or otherwise integrally (monolithically) formed portions of the first shell 21 having the same or similar characteristics as those shown and described with respect to the disclosed embodiment having the fittings 41, 51 received within the openings 27, 28, as desired, while remaining within the scope of the present invention.

Figure 5:
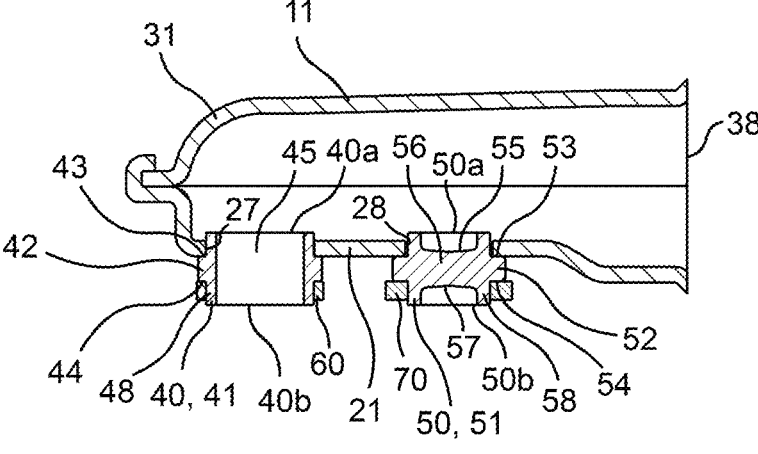
FIG. 5 is an elevational cross-sectional view of the first pipe connection structure as taken from the perspective of section lines 5-5 in FIG. 4.

The first coupling element 40 includes an inner portion 40a configured for reception through the first opening 27 of the first shell 21 and an outer portion 40b projecting outwardly from the first opening 27 to position the outer portion 40b exterior to the first shell 21 and the first pipe connection structure 11. The second coupling element 50 similarly includes an inner portion 50a configured for reception through the second opening 28 of the first shell 21 and an outer portion 50b projecting outwardly from the second opening 28 to position the outer portion 50b exterior to the first shell 21 and the first pipe connection structure 11. As shown in FIG. 5, each of the inner portions 40a, 50a may include an axial length for extending through the corresponding opening 27, 28 of the first shell 21 such that an axial end of each of the inner portions 40a, 50a extends beyond the thickness of the wall of the first shell 21 to be positioned within the interior of the first pipe connection structure 11. Each of the outer portions 40b, 50b projects axially away from the outer surface of the wall forming the first shell 21 at each of the respective openings 27, 28.

The outer portion 40a of the first coupling element 40 provided as the first fitting 41 includes a radially outwardly extending flanged portion 42 intermediate the opposing axial ends of the first coupling element 40. The flanged portion 42 defines a first radially extending surface 43 and an opposing second radially extending surface 44 spaced apart axially from the first radially extending surface 43 by the thickness of the flanged portion 42. The first radially extending surface 43 is configured to engage an outer surface of the wall forming the first shell 21 and the second radially extending surface 44 is configured to engage a face of a first baffle plate 60 received over and around the first coupling element 40, as explained in greater detail hereinafter. The plane of the first radially extending surface 43 of the flanged portion 42 accordingly represents an axial position where the first coupling element 40 is divided into the inner portion 40a and the outer portion 40b with respect to the axial direction of the first coupling element 40.

The first coupling element 40 includes a through-hole 45 formed therethrough, wherein the through-hole 45 extends axially through the first coupling element 40 in the direction of axial extension thereof from the outer surface of the first shell 21. The through-hole 45 extends axially through both the inner portion 40a and the outer portion 40b of the first coupling element 40 such that the through-hole 45 penetrates an entirety of the first coupling element 40 with respect to the axial direction of extension thereof. In the provided embodiment, the first coupling element 40 and the corresponding through-hole 45 include substantially elliptical, ovular, or rounded-rectangular (non-circular) cross-sectional shapes, although the use of a circular cross-sectional shape in forming the first coupling element 40 and/or the through-hole 45 is not necessarily outside of the scope of the present invention. The through-hole 45 is configured to provide fluid communication between the interior of the first pipe connection structure 11 and an interior of the first manifold tank 12 via axial passage of the fluid through an interior of the first coupling element 40.

The outer portion 50b of the second coupling element 50 provided as the second fitting 51 includes a radially outwardly extending flanged portion 52 intermediate the opposing axial ends of the second coupling element 50. The flanged portion 52 defines a first radially extending surface 53 and an opposing second radially extending surface 54 spaced apart axially from the first radially extending surface 53 by the thickness of the flanged portion 52. The first radially extending surface 53 is configured to engage the outer surface of the of the wall forming the first shell 21 and the second radially extending surface 54 is configured to engage a face of a second baffle plate 70 received over and around the second coupling element 50, as explained in greater detail hereinafter. The plane of the first radially extending surface 53 of the flanged portion 52 accordingly represents an axial position where the second coupling element 50 is divided into the inner portion 50a and the outer portion 50b with respect to the axial direction of the second coupling element 50.

The second coupling element 50 differs from the first coupling element 40 in that the second coupling element 50 does not include a through-hole penetrating the axial length thereof. Instead, the second coupling element 50 includes at least one blind hole 55, 57 formed therein, wherein each of the blind holes 55, 57 penetrates only a portion of the axial length of the second coupling element 50 and do not fluidly connect to one another for conveying the refrigerant therethrough. Specifically, the inner portion 50a of the second coupling element 50 includes a first blind hole 55 partially penetrating the axial length of the second coupling element 50 at a first axial end thereof and the outer portion 50b of the second coupling element 50 includes a second blind hole 57 partially penetrating the axial length of the second coupling element 50 at an opposing second axial end thereof. The partial axial penetration of the opposing blind holes 55, 57 results in the formation of a fluid barrier wall 56 of the second coupling element 50 that prevents fluid communication between the interior of the first pipe connection structure 11 and an interior of the first manifold tank 12 via either of the at least one blind holes 55, 57. That is, in contrast to the first coupling element 40, the second coupling element 50 is provided to structurally reinforce the assembly of the first pipe connection structure 11 to the first manifold tank 12 via an additional immovable joint at which the first pipe connection structure 11 is securely affixed to the first manifold tank 12 in the absence of a flow-through for the refrigerant to pass therebetween. As explained hereinafter, the configuration of the first manifold tank 12, the plurality of heat exchanger tubes 13, and the second manifold tank 14 facilitates the ability to utilize only one flow passage between the first pipe connection structure 11 and the first manifold tank 12 by way of only one of the two openings 27, 28 formed through the wall of the first shell 21.

In the provided embodiment, the second coupling element 50 and the corresponding blind holes 55, 57 are substantially cylindrical and thus include a substantially circular cross-sectional shape, although substantially any shape may be utilized in forming the blind holes 55, 57. The blind holes 55, 57 are axially aligned and formed directly opposite each other with respect to the axial direction of the second coupling element 50. The fluid barrier wall 56 is formed by a portion of the second coupling element 50 disposed at an inner axial end of each of the corresponding blind holes 55, 57. In other words, the fluid barrier wall 56 forms a first surface defining an axial end of the first blind hole 55 and an oppositely arranged second surface defining an axial end of the second blind hole 57. In the illustrated embodiment, each of the surfaces of the fluid barrier wall 56 forming the axial end of a respective one of the blind holes 55, 57 is concave in shape due to an annular arcuate transition of a cylindrical and axially extending circumferential surface of each of the respective blind holes 55, 57 to a substantially planar axial end surface of the corresponding one of the blind holes 55, 57 disposed along the fluid barrier wall 56. The tapered concave shape at the inner axial end of each of the blind holes 55, 57 may be selected to aid in manufacturing each of the blind holes 55, 57, such as via the use of a rotational cutting tool (i.e. a drill) or a molding process, wherein the tapered and concave shape facilitates ease of removal of the rotational cutting tool or the mold from the completed one of the blind holes 55, 57. The second coupling element 50 may be provided with the at least one blind hole 55, 57 to minimize the material utilized in forming the second coupling element 50 while still maintaining a structural integrity thereof and while still providing the fluid barrier wall 56 for preventing fluid communication through the second coupling element 50 by way of the at least one blind hole 55, 57.

The first manifold tank 12 includes an assembly of a base wall structure 80, a first wall element 81, and a second wall element 82. The base wall structure 80 cooperates with the first wall element 81 to form a first tank compartment 83 of the first manifold tank 12, and the base wall structure 80 further cooperates with the second wall element 82 to form a second tank compartment 84 of the first manifold tank 12 provided independently of the first tank compartment 83 thereof. Specifically, the base wall structure 80 includes a first lateral wall 80a, a central wall 80b, a second lateral wall 80c, a first connecting wall 80d connecting the first lateral wall 80a to the central wall 80b, and a second connecting wall 80e connecting the second lateral wall 80c to the central wall 80b. The first wall segment 81 may be substantially semi-circular in cross-sectional shape and may be configured for reception within a space formed between the first lateral wall 80a and the central wall 80b, wherein the first tank compartment 83 is defined by the cooperation of the interior of the first wall segment 81 and the interiors of each of the first lateral wall 80a, the first connecting wall 80d, and the central wall 80b. The second wall segment 82 may be substantially semi-circular in cross-sectional shape and may be configured for reception within a space formed between the second lateral wall 80c and the central wall 80b, wherein the second tank compartment 84 is defined by the cooperation of the interior of the second wall segment 82 and the interiors of each of the second lateral wall 80c, the second connecting wall 80e, and the central wall 80b.

Figures 6, 7, 8:
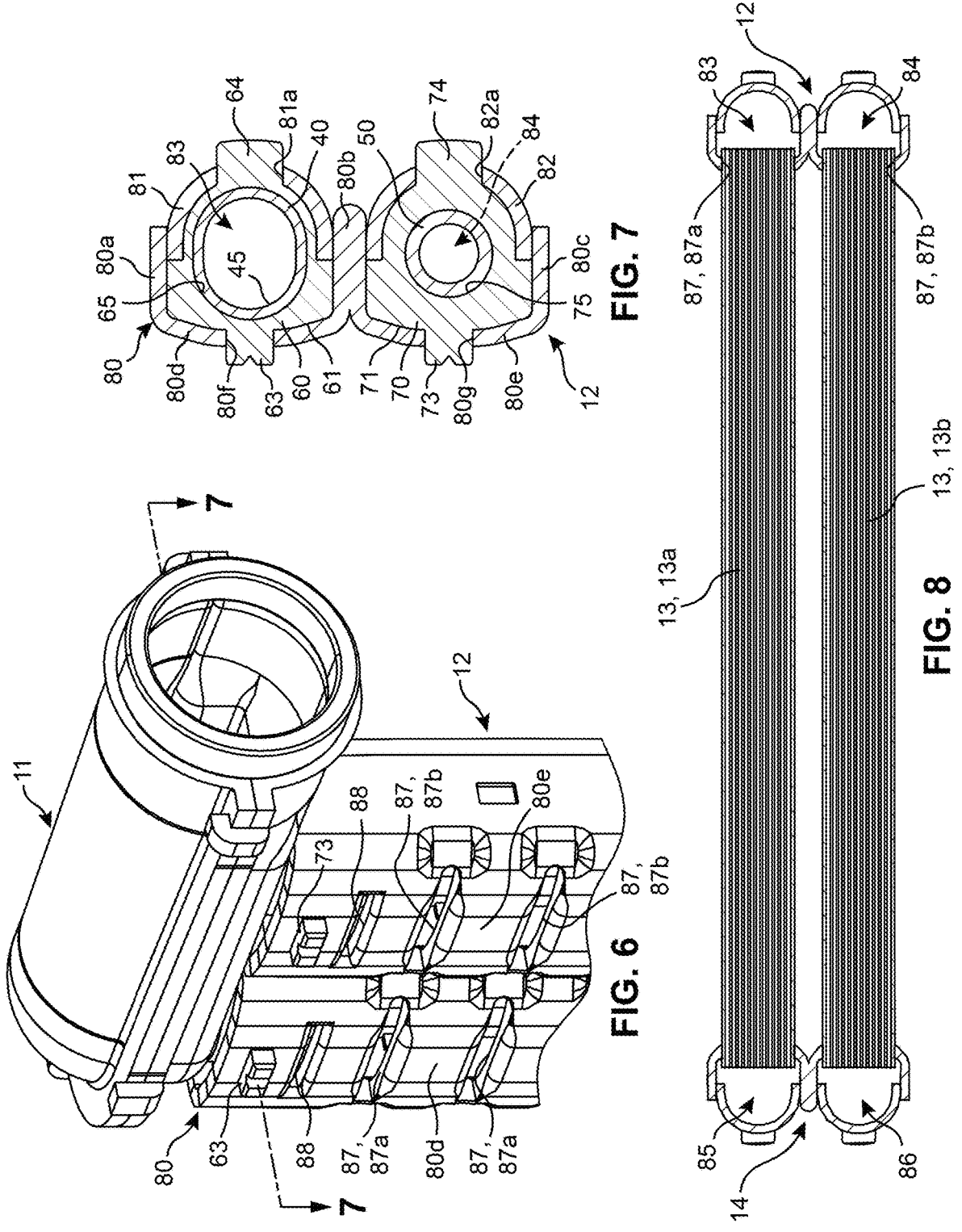
FIG. 6 is an enlarged and fragmentary perspective view of a portion of the internal condenser showing the first pipe connection structure coupled to a first manifold tank of the internal condenser.
FIG. 7 is a cross-sectional view taken from the perspective of section lines 7-7 in FIG. 6 and shows a manner of coupling of the first pipe connection structure to the first manifold tank via intervening coupling elements and baffle plates of the internal condenser.
FIG. 8 is a cross-sectional view taken from the perspective of section lines 8-8 in FIG. 2 and shows a plurality of heat exchanger tubes of the internal condenser fluidly coupling the tank compartments of oppositely arranged first and second manifold tanks to each other.

The first baffle plate 60 is configured to couple the first coupling element 40 to the first manifold tank 12 at a position in axial alignment with the first tank compartment 83 while the second baffle plate 70 is configured to couple the second coupling element 50 to the first manifold tank 12 at a position in axial alignment with the second tank compartment 84. As shown in FIG. 7, the first baffle plate 60 includes an outer circumferential surface 61 having a cross-sectional shape that corresponds to the cross-sectional shape of the first tank compartment 83 with the exception of a first coupling tab 63 and a second coupling tab 64 projecting radially outwardly from opposing sides of the outer circumferential surface 61, wherein the described radial direction is perpendicular to the described axial direction of the corresponding first coupling element 40. The first baffle plate 60 further includes a central opening 65 shaped and sized for reception of an axial end portion 48 (FIG. 5) of the first coupling element 40 therethrough when the first baffle plate 60 is received thereover. More specifically, the axial end portion 48 forms an end portion of the outer portion 40b of the first coupling element 40 disposed distally from the wall of the first pipe connection structure 11. The first baffle plate 60 is utilized as an end plate (baffle) for delimiting the flow of the refrigerant in the axial direction of the first tank compartment 83 towards the first pipe connection structure 11 via reception of the first baffle plate 60 over the first coupling element 40 and an assembly of the base wall structure 80 to the first wall element 81 with the outer circumferential surface 61 of the first baffle plate 60 engaging the interior surfaces defining the inner facing surfaces of the first tank compartment 83. The reception of the first baffle plate 60 within the first manifold tank 12 further includes the first coupling tab 63 extending through an opening 80f formed through the base wall structure 80 and the second coupling tab 64 extending through an opening 81*a* formed through the first wall element 81, wherein each of the openings 80*f*, 81*a* includes a perimeter shape for closely receiving the corresponding coupling tab 63, 64 therein.

The second baffle plate 70 includes an outer circumferential surface 71 having a cross-sectional shape that corresponds to the cross-sectional shape of the second tank compartment 84 with the exception of a first coupling tab 73 and a second coupling tab 74 projecting radially outwardly from opposing sides of the outer circumferential surface 71, wherein the described radial direction is perpendicular to the described axial direction of the corresponding second coupling element 50. The second baffle plate 70 further includes a central opening 75 shaped and sized for reception of an axial end portion 58 (FIG. 5) of the second coupling element 50 therethrough when the second baffle plate 70 is received thereover. More specifically, the axial end portion 58 forms an end portion of the outer portion 50*b* of the second coupling element 50 disposed distally from the wall of the first pipe connection structure 11. The second baffle plate 70 is utilized as an end plate (baffle) for delimiting the flow of the refrigerant in the axial direction of the second tank compartment 84 towards the first pipe connection structure 11 via reception of the second baffle plate 70 over the second coupling element 50 and an assembly of the base wall structure 80 to the second wall element 82 with the outer circumferential surface 71 of the second baffle plate 70 engaging the interior facing surfaces defining the second tank compartment 84. The reception of the second baffle plate 70 within the first manifold tank 12 further includes the first coupling tab 73 extending through an opening 80*g* formed through the base wall structure 80 and the second coupling tab 74 extending through an opening 82*a* formed through the second wall element 82, wherein each of the openings 80*g*, 82*a* includes a perimeter shape for closely receiving the corresponding coupling tab 73, 74 therein.

The second manifold tank 14 and the second pipe connection structure 15 include substantially identical structure to the first manifold tank 12 and the first pipe connection structure 11 while rotated 180 degrees about an axis extending in the longitudinal direction of one of the tank compartments 83, 84 to an opposing end of the plurality of the heat exchanger tubes 13, hence description of the structure thereof is limited hereinafter to any differences or distinctions present therebetween, where present. Additionally, the same reference numerals are utilized when describing the same features present between the first manifold tank 12 and the second manifold tank 14. As shown in the cross-sectional view of FIG. 8, the second manifold tank 14 defines a third tank compartment 85 disposed opposite the first tank compartment 83 and a fourth tank compartment 86 disposed opposite the second tank compartment 84. A first column 13*a* of the plurality of the heat exchanger tubes 13 extends between and fluidly couples the first tank compartment 83 of the first manifold tank 12 to the third tank compartment 85 of the second manifold tank 14 and a second column 13*b* of the plurality of the heat exchanger tubes 13 extends between and fluidly couples the second tank compartment 84 of the first manifold tank 12 to the fourth tank compartment 86 of the second manifold tank 14. FIG. 8 shows only a single one of the heat exchanger tubes 13 forming each of the described columns 13*a*, 13*b*, whereas FIG. 2 shows the entirety of the second column 13*b* of heat exchanger tubes 13. The first column 13*a* of the heat exchanger tubes 13 includes the same configuration as shown with respect to the second column 13*b* at a position lateral thereto while extending between the opposing tank compartments 83 and 85 in the manner described above.

FIG. 8 illustrates the heat exchanger tubes 13 of each of the columns 13*a*, 13*b* as having a multi-channel configuration wherein a surface area of each of the heat exchanger tubes 13 exposed to the refrigerant passing therethrough is maximized to increase a heat exchange capacity of each of the heat exchanger tubes 13. In the present embodiment, each of the heat exchanger tubes 13 may be extruded to include a plurality of the fluid conveying channels in a laterally aligned row with wall segments separating the adjacent channels from one another. However, the heat exchanger tubes 13 may include substantially any heat exchanging or fluid conveying configuration while remaining within the scope of the present invention.

As shown in FIGS. 6 and 8, the base wall structure 80 of the first manifold tank 12 further includes a plurality of tube openings 87 formed therein with each of the tube openings 87 receiving an end portion of one of the heat exchanger tubes 13 therein. More specifically, the first connecting wall 80*d* includes a plurality of first tube openings 87*a* formed therein and the second connecting wall 80*e* includes a plurality of second tube openings 87*b* formed therein. Each of the first tube openings 87*a* is configured to receive one of the heat exchanger tubes 13 of the first column 13*a* therein while each of the second tube openings 87*b* is configured to receive one of the heat exchanger tubes 13 of the second column 13*b* therein. The base wall structure 80 may further include corresponding connector openings 88 for receiving tabbed portions of one of the described connecting plates 17, 18 therein at either of the ends of the columns 13*a*, 13*b* of the heat exchanger tubes 13. As mentioned above, the corresponding features of the second manifold tank 14, which are identical and oppositely arranged, include similar openings for receiving opposing ends of the heat exchanger tubes 13 and/or the connecting plates 17, 18 therein for coupling the opposing manifold tanks 12, 14 to one another, hence further description is not included herein.

The internal condenser 10 includes only a single one of the tank compartments 83, 86 of each of the respective manifold tanks 12, 14 placed in direct fluid communication with an interior of a corresponding pipe connection structure 11, 15 via a corresponding first coupling element 40 having one of the through holes 45 formed therein, whereas the other of the tank compartments 84, 85 associated with each of the respective manifold tanks 12, 14 is positioned in alignment with a corresponding blind hole associated with strengthening a connection between the corresponding manifold tank 12, 14 and pipe connection structure 11, 15 juncture. As a result, at least one of the manifold tanks 12, 14 must include corresponding structure for fluidly communicating the refrigerant between the adjacent disposed tank compartments 83, 84 or tank compartments 85, 86 in order to utilize the two different columns 13*a*, 13*b* of the heat exchanger tubes 13 when exchanging heat between the refrigerant and the surrounding air.

FIGS. 9-12 illustrate one possible flow configuration through the internal condenser 10 with the wall segments 81, 82 removed from the base wall structure 80 of each of the respective manifold tanks 12, 14 and with the second shell 31 of each of the respective pipe connection structures 11, 15 removed from the corresponding first shell 21 to more easily show the internal structure of the internal condenser 10. In contrast to the first manifold tank 12, the second manifold tank 14 includes at least one fluid communication opening 92 (FIG. 10) formed through the corresponding central wall 80b of the base wall structure 80 thereof to allow for fluid communication between the third and fourth tank compartments 85, 86, wherein the fluid communication openings 92 may be formed at positions through a portion of the central wall 80b spaced apart from or opposite the second pipe connection structure 15. The second manifold tank 14 also differs from the first manifold tank 12 by the addition of an interior baffle plate 93, which includes substantially identical structure to each of the baffle plates 60, 70 with the exception of the removal of a central opening for receiving a projecting portion of one of the coupling elements 40, 50 therethrough. Instead, the interior baffle plate 93 divides the fourth tank compartment 86 into an upstream portion 86a and a downstream portion 86b with respect to the flow of the refrigerant through the internal condenser 10, as explained in greater detail hereinafter. As shown throughout the figures, each of the manifold tanks 12, 14 may further utilize end baffle plates 94 having the same structure as the disclosed interior baffle plate 93, wherein each of the end baffle plates 94 delimits flow of the refrigerant within the corresponding tank compartment in a direction away from the corresponding pipe connection structure 11, 15.

As shown in FIG. 9, the refrigerant enters the interior of the first pipe connection structure 11 via the cylindrical opening 38 thereof before turning to flow through the through hole 45 of the first coupling element 40. The refrigerant enters the first tank compartment 83 of the first manifold tank 12 and flows axially therethrough for distribution to each of the first column 13a of the heat exchanger tubes 13 leading to the third tank compartment 85 of the second manifold tank 14.

As shown in FIG. 10, once the refrigerant enters the third tank compartment 85, the refrigerant is caused to flow axially towards and then laterally through the fluid communication openings 92 of the second manifold tank 14 (in a direction perpendicular to the axial direction of the third tank compartment 85) and into the adjacent fourth tank compartment 86. The interior baffle plate 93 delimits axial flow of the refrigerant in a direction towards the second pipe connection structure 15 when flowing through the upstream portion 86a of the fourth tank compartment 86, and hence causes the refrigerant to instead flow through a first portion of the second column 13b of the heat exchanger tubes 13 in a direction back towards the second tank compartment 84 of the first manifold tank 12. As shown in FIG. 11, the refrigerant is then able to flow back to the downstream portion 86b of the fourth tank compartment 86 through a second portion of the second column 13b of the heat exchanger tubes 13 after flowing axially within the second tank compartment 84 in a direction towards the first pipe connection structure 11. The downstream portion 86b is in fluid communication with the corresponding through-hole 45 leading to the interior of the second pipe connection structure 15, which allows the refrigerant to exit the second pipe connection structure 15 while flowing in a lateral direction opposite to that at which the refrigerant enters the first pipe connection structure 11, as shown in FIG. 12.

It should be apparent that the manifold tanks 12, 14 and each of the respective tank compartments 83, 84, 85, 86 may include alternative flow configurations formed therethrough while remaining within the scope of the present invention, such as including additional fluid communication openings 92 and/or interior baffle plates 93 to cause the refrigerant to undergo additional changes in flow direction, as desired. It should also be apparent that each of the manifold tanks 12, 14 may be formed to include additional tank compartments by modifying the base wall structure 80 to include additional interior walls (corresponding to the central wall 80b) intermediate the outermost walls (corresponding to the first and second lateral walls 80a, 80c) with a respective wall element (corresponding to one of the wall segments 81, 82) spanning the space between the walls of the modified base wall structure 80 to form three or more tank compartments with respect to a lateral direction of the modified base wall structure 80. In such a modified manifold tank, one or more of the resulting additional tank compartments may be aligned with one of the disclosed coupling elements 40, 50 where it is desired to cause or prevent fluid communication between the respective tank compartments and an interior of the corresponding pipe connection structure 11, 15. Such a modified manifold tank would also result in corresponding modifications to the aligned pipe connection structure 11, 15, such as including one of the coupling elements 40, 50 in alignment with each of the resulting tank compartments. For example, a manifold tank having three of the tank compartments may include one of the coupling elements 40 having the through-hole 45 and two of the coupling elements 50 having the barrier wall 56 and the at least one blind hole 55, 57 formed therein, wherein each of the coupling elements 50 aids in providing structural reinforcement to the joint formed between the pipe connection structure 11, 15 and the aligned manifold tank 12, 14.

Each of the disclosed structures may be further coupled to one another via a corresponding aggressive joining method for forming a fluid-tight seal at each of the disclosed joints present between the structural elements thereof. For example, each of the joints where the pipe connection structures 11, 12, the coupling elements 40, 50, the baffle plates 60, 70, 93, 94, the base wall structures 80, the wall segments 81, 82, and the heat exchanger tubes 13 are engaged to each other may be scalingly joined by a brazing process once the internal condenser 10 is assembled into the configuration shown throughout the drawings. However, alternative joining methods may be utilized while remaining within the scope of the present invention, such as utilizing press-fit couplings or mechanical deformations of one or more engaging components (such as crimping) to form a desired joint between the engaging components.

The present disclosure includes the first coupling element 40 having the through-hole 45 provided distally from the cylindrical opening 38 towards a closed end of the corresponding pipe connection structure 11 and the second coupling element 50 having the fluid barrier wall 56 provided proximally to the cylindrical opening 38. However, it should be readily apparent to one skilled in the art that the positioning of the coupling elements 40, 50 may be switched for prescribing a different flow configuration through the tank compartments 83, 84, 85, 86 of the manifold tanks 12, 14 without departing from the scope of the present invention. That is, the proximally positioned one of the coupling elements 40, 50 adjacent the cylindrical opening 38 may instead be the first coupling element 40 having the through-hole 45 and the distally positioned one of the coupling elements 40, 50 disposed towards the closed end of the pipe connection structure 11 may be the second coupling element 50 having the fluid barrier wall 46 formed by the presence of the blind-hole 57, wherein the flow configuration through the manifold tanks 12, 14 would differ from that disclosed to account for the refrigerant entering and/or exiting each respective manifold tank 12, 14 at positions in alignment with the tank compartments 84, 85 rather than the tank compartments 83, 86. An example of such an alternative pipe connection structure 111 having the coupling elements 40, 50 switched in position is shown in FIG. 13. As noted previously, the pipe connection structure 11 may also be modified to include three or more of the coupling elements 40, 50 for alignment with three or more of the tank compartments forming modified versions of the manifold tanks 12, 14, wherein any order of the different coupling elements 40, 50 may be utilized in the proximal to distal direction away from the cylindrical opening 38 while remaining within the scope of the present invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A heat exchanger, comprising:
a first pipe connection structure including a first outer wall defining at least a portion of an interior of the first pipe connection structure, the interior of the first pipe connection structure receiving a first fluid therein;
a first coupling element received in a first opening formed through the first outer wall of the first pipe connection structure, the first coupling element including a first through-hole formed therethrough;
a second coupling element received in a second opening formed through the first outer wall of the first pipe connection structure; and
a first manifold tank coupled to each of the first coupling element and the second coupling element, the first manifold tank including a first tank compartment extending longitudinally from the first coupling element and a second tank compartment extending longitudinally from the second coupling element, the first through-hole of the first coupling element providing fluid communication of the first fluid between the interior of the first pipe connection structure and the first tank compartment and the second coupling element forming a first fluid barrier wall for preventing fluid communication of the first fluid between the interior of the first pipe connection structure and the second tank compartment by way of the second coupling element.

2. The heat exchanger of claim 1, wherein the second coupling element includes at least one blind hole formed therein.

3. The heat exchanger of claim 2, wherein the at least one blind hole is cylindrical in shape.

4. The heat exchanger of claim 2, wherein the at least one blind hole is formed in one or both of a first axial end of the second coupling element facing towards the interior of the first pipe connection structure and/or a second axial end of the second coupling element facing away from the interior of the first pipe connection structure.

5. The heat exchanger of claim 2, wherein the at least one blind hole includes a first blind hole formed in a first axial end of the second coupling element and a second blind hole formed in a second axial end of the second coupling element.

6. The heat exchanger of claim 5, wherein the first blind hole is formed directly opposite the second blind hole with the first blind hole axially aligned with the second blind hole.

7. The heat exchanger of claim 5, wherein the first fluid barrier wall is formed by a portion of the second coupling element disposed directly between the first blind hole and the second blind hole.

8. The heat exchanger of claim 2, wherein the first fluid barrier wall is disposed at an inner axial end of the at least one blind hole.

9. The heat exchanger of claim 8, wherein the first fluid barrier wall includes a concave surface formed therein at the inner axial end of the at least one blind hole.

10. The heat exchanger of claim 1, wherein the first through-hole extends through an entirety of the first coupling element with respect to an axial direction thereof.

11. The heat exchanger of claim 10, wherein the axial direction of the first coupling element is parallel to a longitudinal direction of the first tank compartment.

12. The heat exchanger of claim 10, wherein a first axial end of the first through-hole is disposed within the interior of the first pipe connection structure and a second axial end of the first through-hole is disposed within the first tank compartment.

13. The heat exchanger of claim 1, wherein the first manifold tank includes a central wall laterally dividing the first manifold tank into the first tank compartment and the second tank compartment, and wherein the central wall includes at least one fluid communication opening formed therethrough for providing fluid communication of the first fluid between the first tank compartment and the second tank compartment.

14. The heat exchanger of claim 1, wherein the first manifold tank includes a first baffle plate disposed around the first coupling element and a second baffle plate disposed around the second coupling element.

15. The heat exchanger of claim 14, wherein the first baffle plate forms an axial end surface of the first tank compartment surrounding the first coupling element for delimiting flow of the first fluid in an axial direction of the first tank compartment towards the interior of the first pipe connection structure and wherein the second baffle plate forms an axial end surface of the second tank compartment surrounding the second coupling element for delimiting flow of the first fluid in an axial direction of the second tank compartment towards the interior of the first pipe connection structure.

16. The heat exchanger of claim 14, wherein the first baffle plate includes a first coupling tab projecting outwardly therefrom and the second baffle plate includes a second coupling tab projecting outwardly therefrom, wherein the first coupling tab is received within a first opening formed through a first wall of the first manifold tank partially defining the first tank compartment and wherein the second coupling tab is received within a second opening formed through a second wall of the first manifold tank partially defining the second tank compartment.

17. The heat exchanger of claim 1, further comprising:
a second manifold tank spaced apart from the first manifold tank and including a third tank compartment and a fourth tank compartment formed therein; and
a plurality of heat exchanger tubes extending between the first manifold tank and the second manifold tank, the plurality of heat exchanger tubes including a first set of heat exchanger tubes providing fluid communication of the first fluid between the first tank compartment of the first manifold tank and the third tank compartment of the second manifold tank and a second set of heat exchanger tubes providing fluid communication of the first fluid between the second tank compartment of the first manifold tank and the fourth tank compartment of the second manifold tank.

18. The heat exchanger of claim 17, wherein the first tank compartment is in fluid communication with the second tank compartment by way of the first fluid flowing through the first set of the heat exchanger tubes, the third tank compartment, the fourth tank compartment, and the second set of the heat exchanger tubes.

19. The heat exchanger of claim 17, further comprising:
a second pipe connection structure including a second outer wall defining at least a portion of an interior of the second pipe connection structure, the interior of the second pipe connection structure receiving the first fluid therein;
a third coupling element received in a third opening formed through the second outer wall of the second pipe connection structure; and a fourth coupling element received in a fourth opening formed through the second outer wall of the second pipe connection structure, the fourth coupling element including a second through-hole formed therethrough;
wherein the second manifold tank is coupled to each of the third coupling element and the fourth coupling element, wherein the third tank compartment extends longitudinally from the third coupling element and the fourth tank compartment extends longitudinally from the fourth coupling element, wherein the second through-hole of the fourth coupling element provides fluid communication of the first fluid between the interior of the second pipe connection structure and the fourth tank compartment, and wherein the third coupling element forms a second fluid barrier wall for preventing fluid communication of the first fluid between the interior of the second pipe connection structure and the third tank compartment by way of the third coupling element.

20. The heat exchanger of claim 19, wherein the second pipe connection structure is structurally identical to the first pipe connection structure with an orientation of the second pipe connection structure rotated 180 degrees relative to the first pipe connection structure.

* * * * *